United States Patent [19]

Vowles et al.

[11] Patent Number: 4,938,907
[45] Date of Patent: Jul. 3, 1990

[54] BRAIDED SLEEVE CUTTER AND METHOD

[75] Inventors: David L. Vowles; Jeanene K. Matkin, both of Phoenix, Ariz.

[73] Assignee: Motorola Inc., Schaumberg, Ill.

[21] Appl. No.: 372,392

[22] Filed: Jun. 27, 1989

[51] Int. Cl.⁵ .............................................. B26D 7/10
[52] U.S. Cl. ........................................ 264/159; 83/16; 83/18; 83/36; 83/171; 83/175; 83/235; 83/209; 83/80
[58] Field of Search ................ 83/18, 26, 36, 35, 262, 83/236, 171, 175, 235, 220, 356, 16, 209, 80; 264/159

[56] References Cited

U.S. PATENT DOCUMENTS

| | | | |
|---|---|---|---|
| 3,468,202 | 9/1969 | Hollis | 83/175 |
| 3,620,114 | 11/1971 | Chudyk | 83/175 |
| 3,978,747 | 9/1976 | Lyon | 83/18 |
| 4,601,225 | 7/1986 | Starnes et al. | 83/175 |
| 4,610,653 | 9/1986 | Savich | 83/171 |
| 4,672,872 | 6/1987 | Kuehnert | 83/171 |
| 4,688,455 | 8/1987 | Takehara | 83/175 |
| 4,691,606 | 9/1987 | Johnson et al. | 83/175 |
| 4,712,459 | 12/1987 | Walkiewicz, Jr. et al. | 83/171 |

*Primary Examiner*—Frank T. Yost
*Assistant Examiner*—Scott A. Smith
*Attorney, Agent, or Firm*—Robert M. Handy

[57] ABSTRACT

Braided plastic sleeving useful in electronic applications is readily cut by means of a hot wire which is advanced through the sleeving when in flattened form at a controlled rate. It is important that the sleeving be under tension at the location where the cut is to be made. The size of the heated wire and the rate of advance of the heated wire through the flattened braided sleeving relative to the size of the braided sleeving is important to obtaining cutting and sealing of the ends of the braided sleeving without welding the ends shut. Means and method for achieving this is described herein.

7 Claims, 2 Drawing Sheets

BRAIDED SLEEVE CUTTER AND METHOD

FIELD OF THE INVENTION

This invention concerns a means and method for cutting braided plastic sleeving or the like into predetermined lengths while avoiding fraying of the ends.

BACKGROUND OF THE INVENTION

Braided plastic sleeving is much used in the electronic industry as a protective covering for wires and electronic components. Such sleeving is manufactured in bulk in very long lengths and must therefore be cut into predetermined lengths prior to use. Because the sleeving is woven or braided, if the cut end is left untreated it frays. Accordingly, it is highly desirable to not only cut the sleeving to the predetermined lengths but also fuse the cut ends to prevent fraying. As used herein, the word "braided" is intended to refer to all manner of sleeving woven or otherwise formed from individual threads or filaments, irrespective of the nature of the weave or forming method.

In the prior art, cutting and sealing of braided sleeving has been accomplished by cutting the sleeving with a shear or knife and then applying heat to the cut so that the ends of the individual fibers are slightly melted and fused together. However, this prior art process suffers from the deficiency that two operations are required. A further difficulty with the prior art method is that, in general, the sleeve must be expanded into its round form before being fused in order to prevent the cut ends from completely sticking together, and thereby sealing the sleeve closed. This problem is much more severe with braided sleeving than solid sleeving since the braided sleeving is comparatively limp and the adjacent wall portions tend to fall together and weld shut when heated unless the cut ends are held open, i.e. expanded into a round shape.

Accordingly, it is an object of the present invention to provide a single-step process for cutting braided plastic sleeve to a predetermined length and fusing the ends to prevent fraying without sealing the ends shut. It is a further object of the present invention to provide an improved means and method for simultaneously cutting and end-fusing braided plastic sleeving into predetermined length while the sleeving is held flat.

SUMMARY OF THE INVENTION

The foregoing and other objects and advantages are provided by a method for simultaneously cutting and fusing braided plastic sleeving, comprising, providing the braided sleeving in a flattened form, clamping a section of the sleeving between two spaced-apart clamps placed one on either side of the intended cut location, stretching the portion of the sleeving between the two clamps, and passing a heated wire having a predetermined temperature and predetermined length greater than the width of the flat sleeving through the flattened sleeving at a predetermined rate. Following the first cut, the sleeving is advanced in preparation for the second cut. It is desirable that the sleeving be advanced a distance greater than the desired predetermined length so as to eject the first cut piece from the cutting apparatus and then retracted to place the location of the desired second cut in alignment with the heated wire and then re-engaging the clamps.

The above described process is conveniently carried out in a cutting apparatus comprising guide means for guiding the flattened sleeve in a longitudinal direction, wherein the guide means is composed of two portions separated by a gap, advancement means for advancing the sleeve through the guide means, length determining means for determining the cut length of the sleeve material, cutting means located in the gap between the two portion of the guide means, wherein the cutting means comprises a wire adapted to be heated, the wire arranged at an angle with respect to the sleeving corresponding to the desired angle of cut, and tensioning means for tensioning the portion of the sleeving located above the cutting wire.

In a preferred embodiment, the tensioning means and advancement means comprise two sets of pinch rollers, a first set of pinch rollers located before the gap and a second set of pinch rollers located after the gap, wherein the pinch rollers are able to rotate at a slightly different rate. The difference in rotation in the pinch rollers is conveniently arranged by coupling two pinch rollers using pulleys or gears of different size.

DETAILED DESCRIPTION OF THE FIGURES

The present invention applies to braided plastic sleeving particularly of those plastic materials which may be heat sealed to prevent fraying. Nylon TM is an example of a suitable material for such plastic sleeving. Other plastics well known in the art may also be used.

Figure 1:
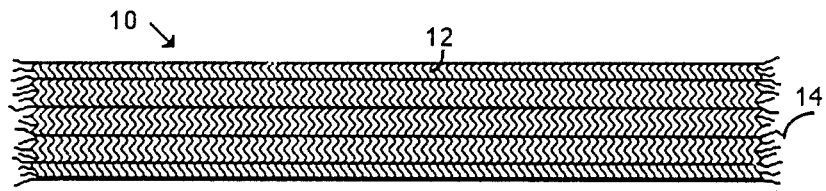
FIG. 1 is a simplified side view of a cut portion of braided sleeving after cutting by a shear and showing frayed ends.

FIG. 1 is a front view in simplified form of a short section 10 of braided plastic sleeving having body portion 12 and frayed ends 14 after cutting using a sheer or other knifelike instrument, according to the prior art.

Figure 2A:
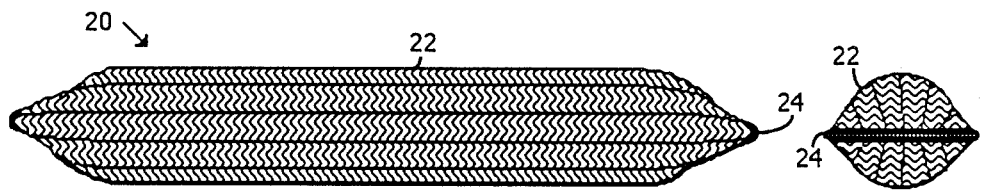
FIG. 2A shows a simplified side view of a cut and fused portion of sleeving, where the end has been welded shut.
Figure 2B:
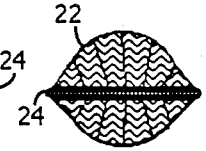
FIG. 2B shows an end view of FIG. 2A.

FIGS. 2A-B show the results of cutting and fusing sleeving 20 having body portion 22 and end portions 24 wherein excessive heat has been applied and the sleeving has been sealed shut at the ends so that it can no longer be opened. FIG. 2B provides an end view of the welded-shut sleeving.

Figure 3A:
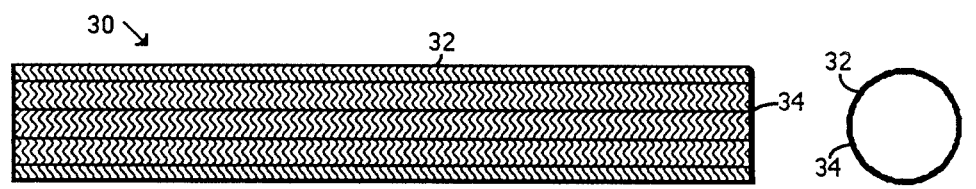
FIG. 3A shows a simplified side view of a cut and fused portion of sleeving according to the method of the present invention.
Figure 3B:
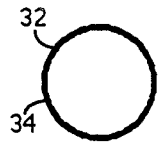
FIG. 3B shows and end view of FIG. 3A.

FIGS. 3A-B show section 30 of braided plastic sleeving having body portion 32 and end portions 34 which have been cut and fused without welding the end portions together so that the cut ends may be opened to a cylindrical form. FIG. 3B provides and end view of the cut and fused sleeving showing that the sleeving is open.

In the tests described herein, a MARKEL Type "Nylon 6" sleeving supplied by the Markel Corporation, Norristown, Penna. was utilized. This sleeving is a 408 denier sleeving having an inner diameter of approximately 7.9 mm and a wall thickness of about 0.8 mm, and which is made up of 68 denier Nylon monofilaments of at least 4 gms/denier which have a melting point of about 250 degrees centigrade. The sleeving has a tenacity of about 1900 gms (peak load) and is of nominally round cross-section when expanded from the flat form in which it is coiled on a shipping reel.

Figure 4:
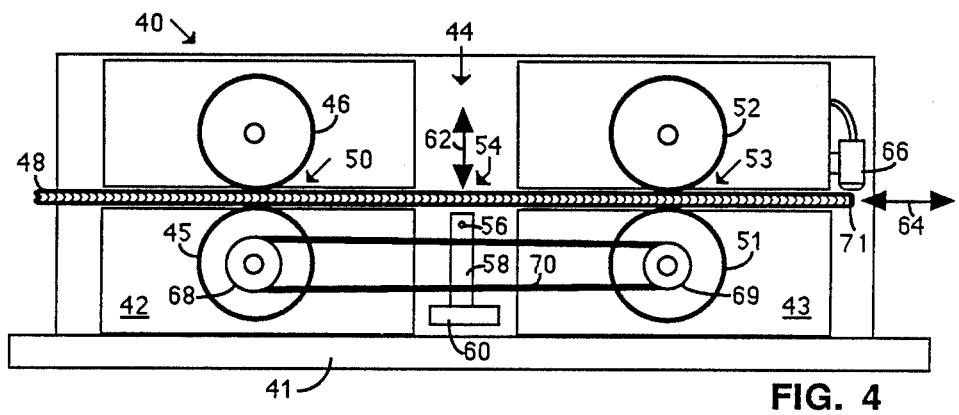
FIG. 4 shows a front view of an apparatus suitable for cutting braided sleeving according to the present invention.

FIG. 4 is a simplified front view of apparatus 40 for cutting and end-fusing woven or other plastic sleeving according to the method of the present invention. Apparatus 40 comprises base 41 on which are mounted sleeving guide means portions 42, 43 spaced apart by gap 44. Guide means portion 42 includes pinch roller set 45, 46 between which is passed flattened braided sleeving 48 so that portion 50 is held between pinch rollers 45, 46. Guide means portion 43 comprises a second pinch roller set 51, 52 between which is clamped portion 53 of flattened braided sleeving 48.

Figure 5:
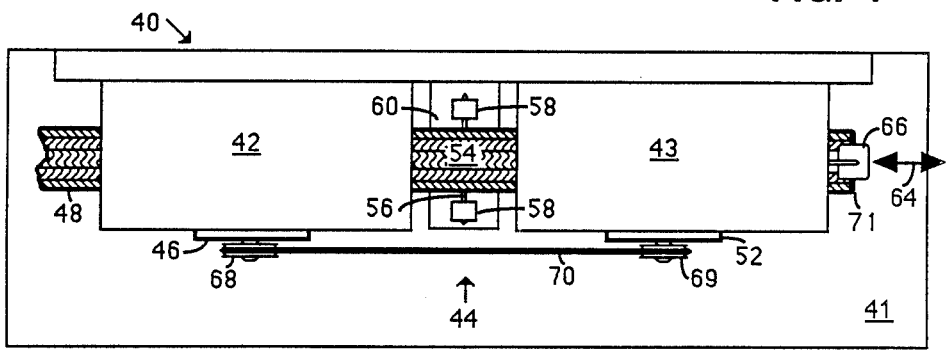
FIG. 5 shows a top view, in simplified form, of the apparatus of FIG. 4.
Figure 6:
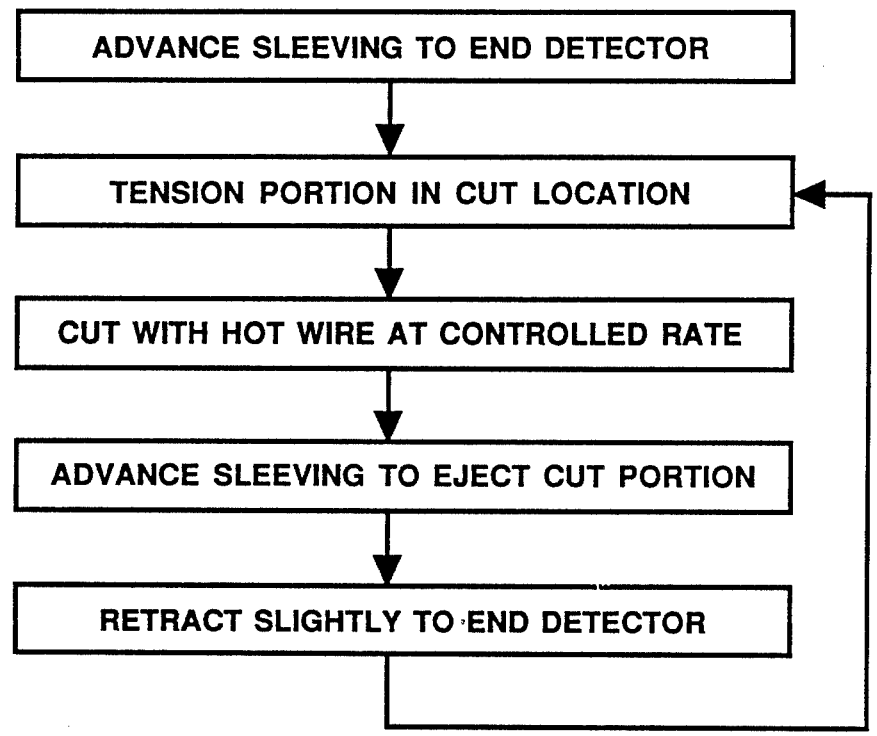
FIG. 6 shows a simplified schematic flow chart illustrating the method of the present invention.

Portion 54 of flattened braided sleeving 48 is located in gap 44. Also located in gap 44 is wire 56 held in place by posts 58 on support 60. Wire 56 travels in the direction of arrows 62. Braided sleeving 48 travels primarily in direction 64. End point detector 66 is conveniently provided at the output end of guide means portion 43. Pulleys 68, 69, are conveniently provided on pinch rollers 45,51 and coupled by belt 70. It is convenient that pulley 68 have a larger diameter than pulley 69. The operation of the apparatus illustrated in FIGS. 4–5 and the method for cutting sleeving 48 according to the present invention is described below.

Braided sleeving 48 is inserted into guide means portion 42, 43 so as to lay between pinch rollers 45, 46 and 51, 52, and be engaged thereby. Pinch rollers 45, 46 and 51, 52 are conveniently rotated at a slightly different rate so that portion 54 of braided sleeving 48 in gap 44 between guide means portions 42, 43 is under a predetermined tension.

While the use of differentially rotated pinch rollers has been shown as an illustrative method for tensioning portion 54 of braided sleeving 48, other methods of tensioning portion 54 may also be used. For example, pinch rollers 45, 46 and 51, 52 may be rotated at the same rate but then be displaced relative to each other after braided sleeving 48 is clamped therebetween.

No matter which tensioning method is adopted, it is important that portion 54 of braided sleeving 48 in gap 44 be under tension during the cutting operation. It has been determined that tensioning sleeving 48 to provide a length extension in the range of approximately 5–30 percent is useful, with length extension in the range 10–20 percent being convenient and about 15 percent being preferred. For the exemplary sleeving, a tension of about 0.2–0.5 Kgms was useful with about 0.35 Kgms being preferred.

After sleeving 48 has been inserted, advanced, and stretched, so that substantially the desired predetermined cut length of sleeving is in place between wire 56 and the end detector 66, heated wire 56 on posts 58 carried by support 60 is moved upwardly in the direction of arrow 62 so as to impinge on portion 54 of braided sleeving 48 at a predetermined rate.

Wire 56 is conveniently heated to a temperature in the range 850 to 1050 degrees centigrade with a range 900 to 1000 degrees centigrade being typical and about 975 degrees centigrade being convenient for the exemplary braided sleeving. For the above mentioned exemplary sleeving, wire 56 was approximately 0.38 mm thick and approximately 30 mm long. This length is about 2.5 times the 12 mm width of the exemplary sleeving when flattened, leaving about 9 mm of wire at each end between the posts and the sleeving. This provides sufficient space for the wire to assume a substantially uniform temperature in the cutting zone without significant end cooling effects in the cutting zone due to posts 58. Heated wire 56 was advanced upwardly in the direction of arrow 62 so as to pass through sleeving 48 at a predetermined rate of approximately 3.6 mm per second, although other rates in the range of 2.4–4.7 mm per second may also be used.

It was observed that the heavier the sleeving, the slower the rate of advance in order to achieve the desired cutting and fusing without welding the sleeving shut. It was likewise found that if wire 56 is too thick the ends of the cut sleeving are welded completely together. If the wire is too thin, it breaks too frequently. The optimum range of wire diameter was determined to be approximately 0.3–0.45 mm for the above-identified sleeving. The same wire diameter is useful for sleeving having about the same mass of material to be cut per unit width of the sleeving. Heavier wire is used for heavier sleeving and lighter wire for lighter sleeving.

It is generally desirable that a relatively robust material able to withstand elevated temperatures be used for wire 56. Any suitable high temperature material may be used for wire 56 but nichrome is preferred. The temperature of wire 56 is conveniently controlled by controlling the amount of current being passed between posts 58.

Where automatic operation of the cutting and sealing apparatus is desired, it is convenient after each cutting stroke of wire 56 at location 54 on sleeve 48 to advance sleeve 48 beyond end detector 66 in order to eject cut portion 53 from guide means 43. After cut portion 53 is ejected from guide means 43, sleeve 48 is then slightly retracted until end 71 is about under end detector 66. Tensioning is conveniently accomplished during or after this retraction step by, for example, differentially rotating pinch rollers 45, 46 with respect to pinch rollers 51, 52 or vice versa.

Automatic operation of apparatus 40 is provided by means of a controller programmed to execute the above described steps of advancing braided sleeve 48, tensioning portion 54, cutting with wire 56, advancing sleeve 48 to eject cut portion 53, slightly retracting sleeve 48 so as to locate the point of the next cut in conjunction with wire 56, and re-tensioning sleeving 48 in preparation for the next cut.

The predetermined length may be easily varied in apparatus 40 by changing the distance between end point detector 66 and wire 56. However other methods may also be used. For example, where the length of cut portion 53 is quite long, take up rolls may be placed between gap 44 and end detector 66. Further, any convenient means, such as for example and not limited to, a distance measuring roller engaging sleeving 48 may be used to determine the length of sleeving which has passed the cutting location over wire 56 in gap 44.

Having thus described the invention it will be readily apparent that the invented method and apparatus provide a means and method for cutting and fusing braided plastic sleeving to prevent frayed ends while avoiding ends which are welded shut. It will be further apparent to those of skill in the art that the above described means and method is particularly simple and effective.

I claim:

1. A method for simultaneously cutting and fusing woven plastic sleeving, comprising:

providing the sleeving in a flattened form;

clamping a section of the sleeving between two spaced apart clamp means placed one on either side of an intended cut location, wherein a predetermined length of sleeving extends beyond the cut location;

uniformly axially tensioning a portion of the sleeving between the two clamp means at the cut location; and cutting off the predetermined length of sleeving by passing a heated wire having a predetermined temperature and predetermined length greater than the width of the flattened sleeving through the axially tensioned portion of the flattened sleeving at a predetermined rate at the cut location, advancing the sleeving by a distance greater than the predetermined length, and then partially retracting the sleeving so that another predetermined length of sleeving extends beyond the cut location, and then repeating the stretching and cutting off steps.

2. The method of claim 1 further comprising during the advancing step, pushing out the cut-off predetermined length of sleeving.

3. The method of claim 1 wherein after the cutting step, an un-cut part of the sleeving remains, and wherein the advancing step advances a cut end of the remaining part of the sleeving, at least to an end location detector.

4. A cutting apparatus for cutting sleeving comprising:

guide means for guiding a flattened sleeving in a longitudinal direction, wherein the guide means is composed of two portions separated by a gap;

cutting means located at a cut location in the gap between the two portions of the guide means, wherein the cutting means comprises a wire adapted to be heated, the wire arranged at an angle with respect to the sleeving corresponding to the desired angle of cut;

end detection means located a predetermined distance beyond the cut location corresponding to the length of material to be cut;

advancement means for advancing the sleeving through the guide means, wherein the advancement means advances the sleeving until an end of the sleeving lies beyond the end detection means and slightly retracts the sleeving until the end lies under the end detection means; and means for uniformly axially tensioning the portion of the sleeving located above the cutting wire.

5. The apparatus of claim 4 wherein the tensioning means and advancement means includes pinch rollers comprising a first pair of pinch rollers located before the gap and a second pair of pinch roller located after the gap.

6. The apparatus of claim 4 wherein the first and second pairs of pinch rollers rotate at a slightly different rate.

7. The apparatus of claim 6 wherein the difference in rotation in pinch rollers is controlled by coupling the two sets of pinch rollers using pulleys or gears of different size.

* * * * *